Sept. 25, 1928.
J. A. HARDING
1,685,284
SPIDER HAVING MECHANICALLY OPERATED PIPE SLIPS
Filed May 21, 1927   2 Sheets-Sheet 1
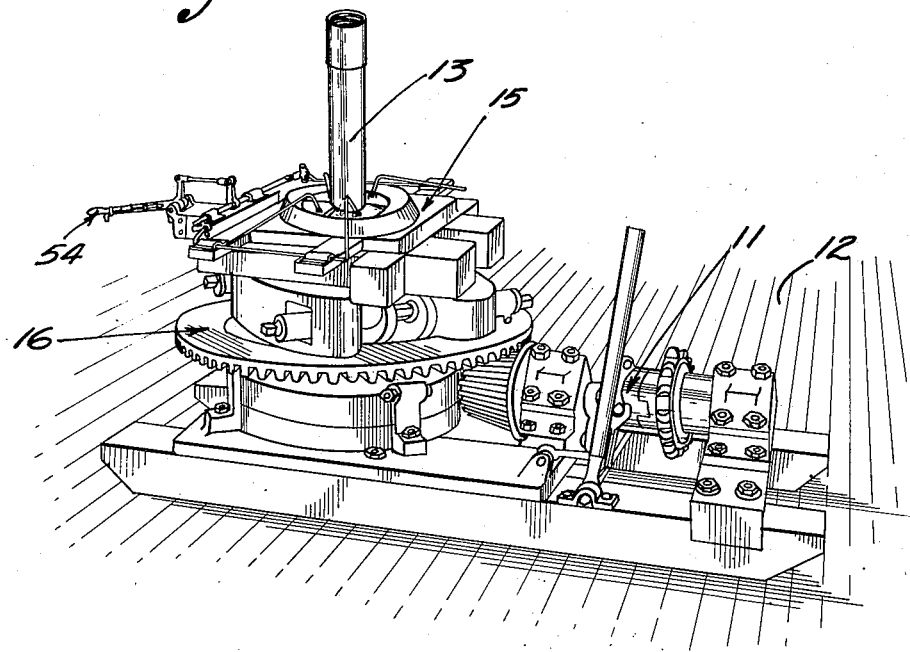
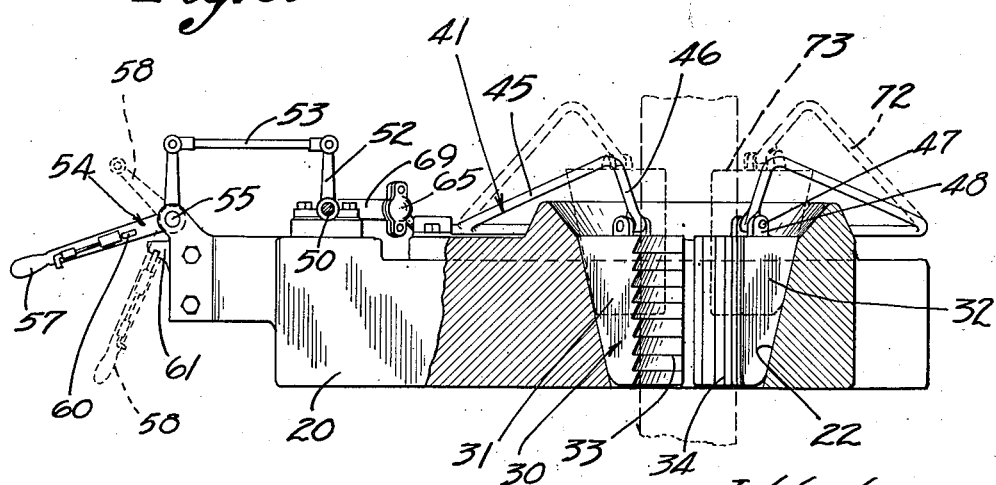
INVENTOR:
JOHN A. HARDING
ATTORNEY.

Sept. 25, 1928.

J. A. HARDING 1,685,284

SPIDER HAVING MECHANICALLY OPERATED PIPE SLIPS

Filed May 21, 1927    2 Sheets-Sheet 2

INVENTOR:
JOHN A. HARDING

BY

ATTORNEY.

Patented Sept. 25, 1928.

1,685,284

UNITED STATES PATENT OFFICE.

JOHN A. HARDING, OF MARICOPA, CALIFORNIA.

SPIDER HAVING MECHANICALLY-OPERATED PIPE SLIPS.

Application filed May 21, 1927. Serial No. 193,369.

This invention relates to the oil well industry and particularly to a device for supporting pipe.

In the oil-producing industry various pipes, such as drill-pipe, and well-casing must be installed and removed from the well. These pipes consist of joints which are connected together by couplings, and as the pipes are installed or removed from the well they must be secured together or disconnected. For the purpose of supporting the pipe during the making or breaking of a joint it is common practice to employ pipe slips which rest in a conical seat. The conical seat is provided by a spider or other suitable body such as the rotary table of a rotary machine. There are commonly four slips used in supporting a pipe. During the time the pipe is raised or lowered so that another joint may be made or broken, the slips are removed from the conical seat. At the present time it requires two workers to place and remove the slips.

It is an object of this invention to provide a pipe support in which the slips are mechanically handled and may be placed or removed from the conical seat by one worker.

The slips are provided with horizontal annular teeth which grip the pipe and support it. It is necessary in making or breaking a joint to have one tong on the lower pipe and another tong on the pipe which is to be secured to or disconnected from the lower pipe. The lower tong is to be utilized for preventing the lower pipe from rotating, and the upper tong is used for rotating the upper part so that the joint may be made or broken.

It is one of the objects of this invention to provide a device for supporting pipe in which the pipe is both supported and restrained from rotation. My invention, therefore, eliminates the use of a lower tong.

A still further object of the invention is to provide a novel mechanism for handling the pipe slips.

Other objects and advantages of the invention will be made evident in the ensuing description, which description is taken in connection with the accompanying drawings in which:

Fig. 1 is a perspective view showing a preferred embodiment of the invention.

Fig. 3 is a section taken on the line 3—3 of Fig. 2.

Figure 2:
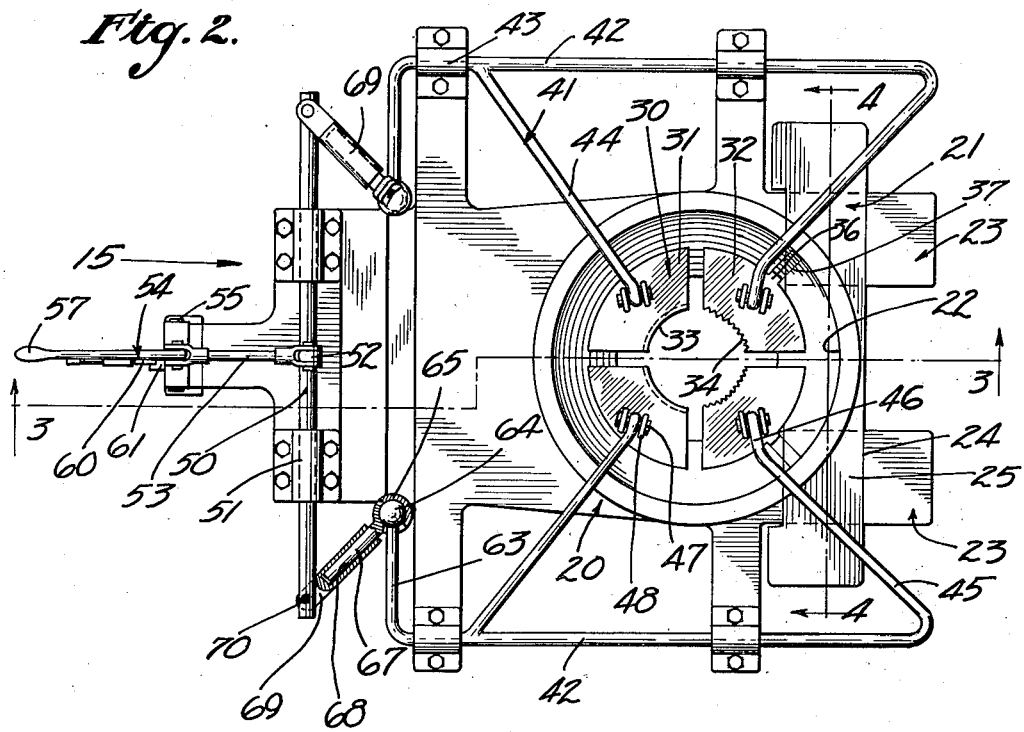
Fig. 2 is a plan view of the invention.
Figure 4:
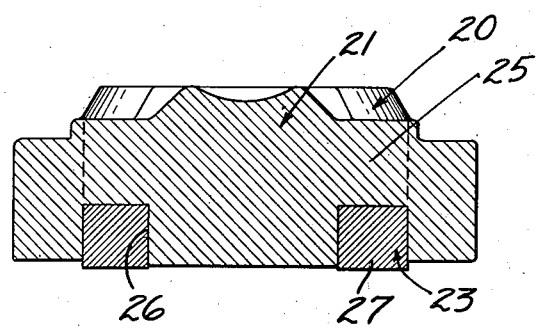
Fig. 4 is a section taken on the line 4—4 of Fig. 2.

Referring to the drawings, the numeral 11 represents a rotary machine supported on a floor 12 of the derrick of a well. Extending into the well, which is not shown in the drawings, is a pipe 13, and supporting the pipe 13 is a pipe-supporting device 15 embodying the features of this invention. The pipe-supporting device 15 in the drawings is shown as supported by a table 16 of the rotary machine 11. The pipe-supporting device is illustrated in detail in Figs. 2 to 4 and includes a body 20 with which a removable section 21 cooperates to provide a conical seat 22. As shown in Figs. 2 and 4 one end of the body 20 has legs 23, these legs 23 being notched at 24. The removable section 21 extends over the legs 23 and portions 25 thereof rest in the notches 24. The removable section also has notches 26 which extend around bridge portions 27 of the legs 23 which extend below the notches 24 thereof.

Adapted to seat in the conical seat 22 are slip-units 30. Each slip-unit 30 consists of a supporting-slip 31 and a gripping-slip 32. The supporting-slips 31 have horizontal teeth 33, and the gripping-slips 32 have vertical teeth 34. Each of the gripping-slips 32 is provided with vertical tongues 36 which extend into vertical grooves 37 formed in the conical seat 22. The purpose of the tongue and groove arrangements is to permit the gripping-slips 32 to slide up and down in the conical seat but to prevent them from rotating relative to it.

Each slip-unit 30 is carried by a slip-carrier 41. The slip-carriers 41 each have a rock shaft 42 supported by bearings 43, these bearings 43 being carried by the body 20. Extending from the rock shaft 42 of each slip-carrier 41 are arms 44. As shown best in Fig. 3 a portion 45 of each arm is inclined, and an end portion of each arm connecting to the inclined portion 45 is directed substantially vertically downward. These downward directed portions are designated by numerals 46. The lower ends of the portions 46 are pivoted by bolts 47 to ears 48 of the slips comprising the slip-units 30.

For the purpose of operating the slip-carriers 41 I provide mechanism which includes an operating-shaft 50 which is disposed at right angles to the rock shafts 42 and is rotatably supported by bearings 51 carried by the body 20. The operating-shaft 50 has an arm 52 to which a link 53 is connected. The link 53 is also connected to a lever 54 which pivots on a shaft 55 carried by the body 20. The lever 54 has a handle 57, by means of which it may be swung from the position shown in full lines in Fig. 3 into the position indicated by dotted lines 58. A suitable latch-rod 60 is provided on the lever 54. This latch-rod 60 is adapted to engage a latch-plate 61 for retaining the lever 54 in the position indicated by dotted lines 58.

The ends of the rock shafts 42 of the slip-carriers 41 nearest to the operating-shaft 50 are provided with crank arms 63 having balls 64 formed on the ends thereof. The balls 64 operate in sockets 65, thus forming ball and socket joints. Extending from the sockets 65 are rods 67 which extend into openings 68 of connecting-members 69. This arrangement provides an extensible link connection or a sliding joint which will compensate for the arcuate movement of the crank-arm 63. The connecting-members 69 are pivoted to the ends of the operating-shaft 50 by pivot-bolts 70. When the lever 54 is moved from the position shown in full lines into dotted line position 58 in Fig. 3, the operating-shaft 50 is rotated so that the carriers are moved from the position shown in full lines in the drawings into the position indicated by dotted lines 72 of Fig. 3. It will be seen that the inner ends of the arms 44 are moved upward so that the slips are moved upward into positions indicated by dotted lines 73 in Fig. 3. When this occurs the slips are moved upward into a larger part of the conical seat 22 and are also moved outward by a slight outward movement of the inner ends of the arms 44. When this is done, the teeth 33 and 34 of the slips are disengaged from the pipe so that the pipe may be raised or lowered, as desired.

From the foregoing description it will be seen that the invention has numerous advantages. The primary advantage, of course, is that the slips are mechanically handled and may be moved from engaging into disengaging position, or vice versa, by one workman operating the lever 54. As previously pointed out, it has heretofore been necessary to have two workmen to handle the slips. In my invention the mechanism simultaneously lowers or raises the slips. The connecting-means consisting of the ball and socket joint and the slide joint is very important to the invention and compensates for the compound relative movement between the crank arms 63 and the operating-shaft 50. The connecting-means is so designed that the carriers may be mechanically engaged and swung so that the slips are removed entirely from the opening surrounded by the conical seat 22.

Another important part of the mechanism for handling the slips is the design of the arms 44. As pointed out, the inner ends 46 of the arms 44 are directed downward into the upper end of the opening surrounded by the conical seat 22. This is very desirable in view of the fact that it permits the pivot-connection between the ears and the slips to be at the upper part of the slips and in such position that when raised the upper ends of the slips do not move outward to such an extent that the slips will bear against the upper part of the conical seat 22 and swing the lower ends inward.

An additional feature of the invention is that the pipe is not only supported but is also gripped from rotation. The horizontal teeth 33 of the supporting-slips 31 are sufficient to support the pipe, and the vertical teeth 34 of the gripping-slips 32 are sufficient to restrain the pipe from rotation. The slips 32 cannot move in a horizontal plane in the opening surrounded by the conical seat 22 because of the tongues and grooves 36 and 37. As previously pointed out, two tongs were necessary in making and breaking the joint. In my invention the tong for holding the lower pipe from rotation is entirely eliminated. The removable section 21 is important because it may be removed so that the body may be slipped into place around a pipe, the removable section 21 being placed after the body has been properly positioned.

In the drawings I have illustrated the body which provides the conical seat 22 as being a separate part. I wish it to be understood that this body 20 need not be a separate part but may consist of a part of some other apparatus of the well equipment; for example, the body might be incorporated as a part of the rotary table 16 of the rotary machine 11. Such modifications as this are clearly within the spirit and scope of this invention.

I claim as my invention:

1. In a device of the nature disclosed, the combination of: a body having a vertical bore formed to define a conical seat; a plurality of slips engaging said conical seat; slip carriers connected to said slips, each of said slip carriers having a rock-shaft journaled on said body and each of said rock-shafts being provided with a crank-arm; an operating-shaft journaled on the body; link connections pivotally connected directly to said operating-shaft and said crank-arms; and means for operating said operating-shaft to rock said carriers and elevate the slips.

2. In a device of the nature disclosed, the combination of: a body having a vertical bore formed to define a conical seat; two pairs of slips engaging said conical seat; two slip-carriers disposed respectively on opposite sides of said bore, one slip-carrier being connected to one pair of said slips and the other carrier being connected to the other pair of said slips and each slip carrier having a rock-shaft journaled on the body and provided with a crank-arm; a single operating-shaft journaled on said body adjacent said crank-arms; link connections pivotally connected directly to said operating-shaft and to said crank-arms; and means for operating said operating-shaft to rock both carriers and elevate both pairs of slips simultaneously.

3. A combination as defined in claim 1 in which the operating-shaft is disposed normal to said rock-shafts.

4. A combination as defined in claim 1 in which the operating-shaft is disposed normal to said rock-shafts and in which said link connections are joined to said crank-arms by universal joints and are extensible to compensate for the arcuate movement of said crank-arms.

5. A combination as defined in claim 1 in which each carrier comprises a plurality of arms, each pivotally connected to one of said slips.

6. A combination as defined in claim 1 in which one of said slips has horizontal teeth and another of said slips has vertical teeth and is provided with means cooperating with the body to prevent it from rotating relative to said body.

7. A combination as defined in claim 2 in which the operating-shaft is disposed normal to said rock-shafts.

8. A combination as defined in claim 2 in which the operating-shaft is disposed normal to said rock-shafts and in which said link connections are each joined to the respective crank-arms by universal joints and are each extensible to compensate for the arcuate movement of the respective crank-arms.

9. A combination as defined in claim 2 in which one of each pair of slips has horizontal teeth and the other of each pair of slips has vertical teeth and means cooperating with the body to prevent it from rotating relative to said body.

In testimony whereof, I have hereunto set my hand at Los Angeles, California, this 16th day of May, 1927.

JOHN A. HARDING.